No. 819,918. PATENTED MAY 8, 1906.
C. E. PECZENIK.
HAND CAMERA.
APPLICATION FILED OCT. 1, 1904.
3 SHEETS—SHEET 1.
Fig.1.
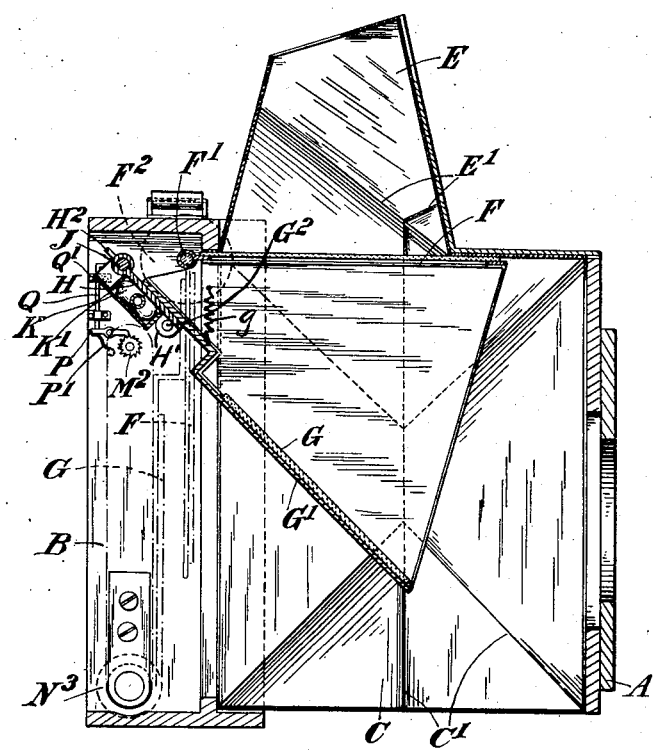
Witnesses
Inventor No. 819,918. PATENTED MAY 8, 1906.
C. E. PECZENIK.
HAND CAMERA.
APPLICATION FILED OCT. 1, 1904.

3 SHEETS—SHEET 3.

UNITED STATES PATENT OFFICE.

CHARLES E. PECZENIK, OF LONDON, ENGLAND.

HAND-CAMERA.

No. 819,918.　　Specification of Letters Patent.　　Patented May 8, 1906.

Application filed October 1, 1904. Serial No. 226,847.

*To all whom it may concern:*

Be it known that I, CHARLES EDMUND PECZENIK, a subject of the King of Great Britain, residing at 53 Portland Place, London, W., England, have invented certain new and useful Improvements in Hand-Cameras, of which the following is a specification.

Twin-lens and reflector cameras generally have been hitherto of a bulky nature.

The object of this invention is to reduce the size of cameras of the reflector type to make them more portable and convenient to use. The novel feature of this reflector-camera is that it is so constructed that when not in use it may be closed up in a comparatively small compass.

Figure 2:
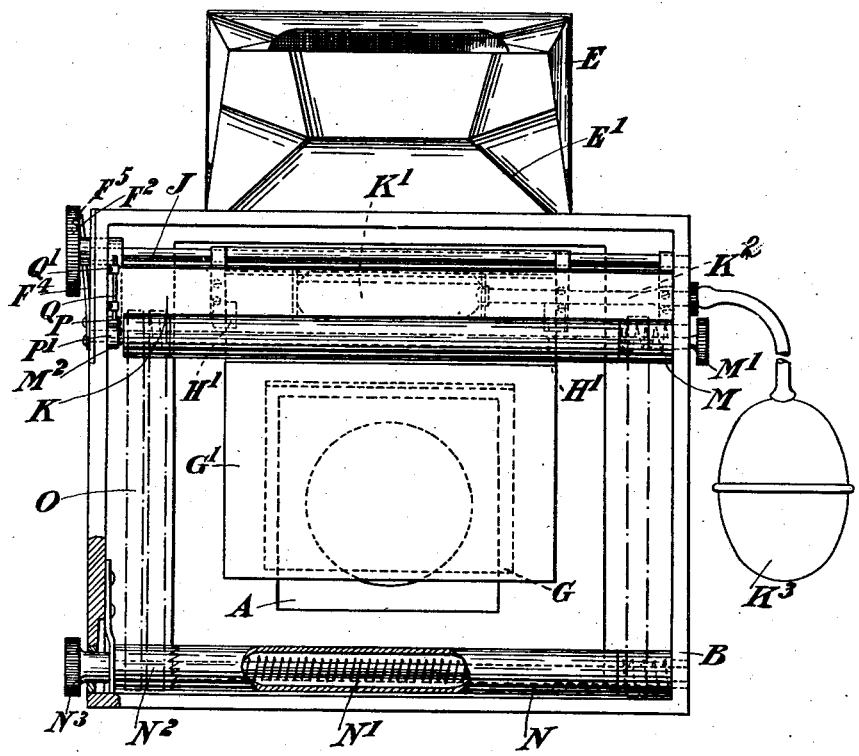
Figure 3:
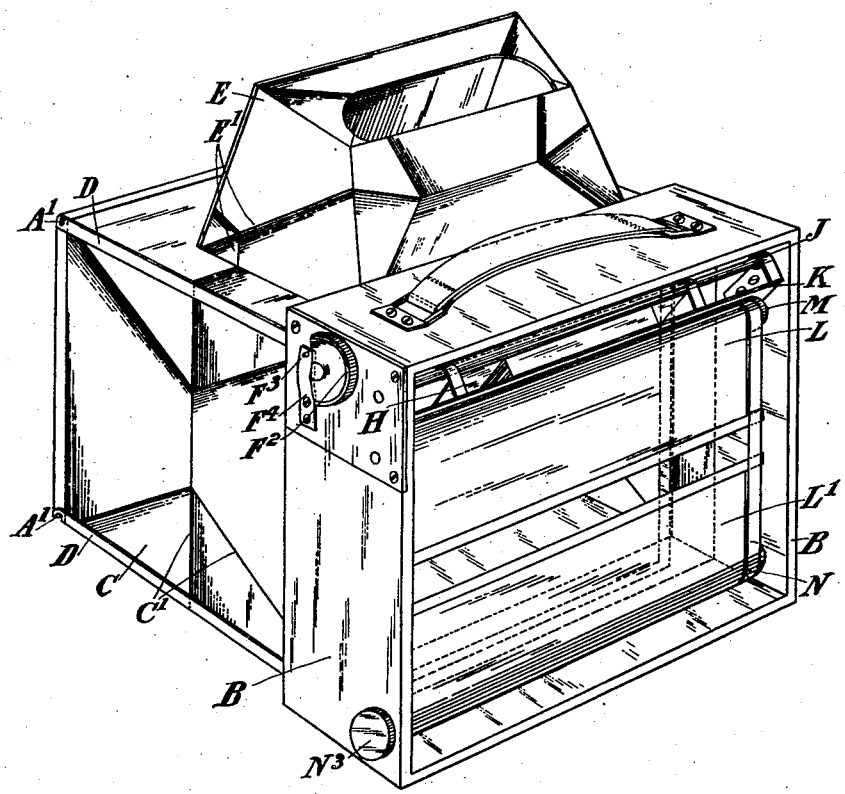

In the accompanying drawings, Figure 1 is a longitudinal section of one form of hand-camera constructed in accordance with this invention. Fig. 2 is a back view of the same, and Fig. 3 is a perspective view of the same.

Like letters indicate like parts throughout the drawings.

Between the lens-board A, which carries the lens, and the back of the camera B, which carries the plate or film, is fixed a bellows or gusset C. The lens-board A in its extended position is held open by distance-bars D, pivoted to the back B and engaging pins A' on the lens-board. When the camera is not in use, the lens-board A can be brought near the back B, the gusset C and the focusing-hood E folding up at the creases C' and E' and allowing the body to collapse, the distance-bars D turning into the back B.

The focusing-screen F is carried on a spindle F', journaled in the sides of the camera-back B. The spindle is provided with a milled knob F² outside the case on one side, whereby the screen F may be turned, and stop F³ on a leaf-spring F⁴ on the back B is arranged to engage a recess F⁵ on the knob F² when the screen F is turned into a horizontal position for focusing, as shown in full lines in Fig. 1, and when it is desired to collapse the camera the screen is turned into a vertical position in the back of the camera, as shown in dotted lines in Fig. 1. The point of a tool, knife, or the finger may be pressed inwardly against the spring F⁴ in order to disengage the stop F³ thereof from the recess F⁵.

The reflecting-mirror G is attached to a plate G', which is bent twice at right angles, and is carried on a spindle G², journaled in two bearings H' in a frame H, pivoted on a rod J, supported in the sides of the camera. The frame H normally rests on a fixed cradle K, connected with the rod J and with the sides of the camera. Within the cradle is a pneumatic bulb K', connected by an air-tube K² with a pneumatic hand-ball K³, and when the ball K³ is pressed and the bulb K' expanded the frame H is tilted upward about the rod J and carries with it the mirror G, which is thus moved out of the path of the rays from the lens.

The mirror-plate G' is normally held flat against the frame H by means of a spring $g$ or the like; but when the focusing-screen F is turned down in a vertical position it carries the mirror G with it, as shown in the dotted lines in Fig. 1, so that the body C of the camera is free to collapse.

The shutter is of the focal-plane type. It comprises an upper blind L on a roller M and a lower blind L' on a roller N, the two rollers being connected by an elastic band O or otherwise. The lower roller N contains a spring N', which tends to pull the blinds down. The spindle of the upper roller M has a milled knob M' outside the camera, whereby the blinds L L' may be turned up onto the upper roller M, and a toothed wheel M² on the end of the roller-spindle is normally prevented from rotating backward by a pivoted pawl P, controlled by a spring P'. The tail end of the pawl P supports a light rod Q, which can slide in guides Q', and the upper end of the rod Q is arranged in the path of a projection H² on the frame H, so that when the frame H is tilted up by the pneumatic bulb K' the projection H² presses down the rod Q against the action of the spring P', and thus releases the toothed wheel M² and allows the spring N' to pull down the shutter onto the lower roller N.

The body of the camera may be of leather, cloth, metal, wood, or the like. The focusing-screen may be of any known type.

Having now particularly described and ascertained the nature of my said invention and in what manner the same is to be performed, I declare that what I claim is—

1. In a reflector-focusing camera, the combination of the camera-back, focusing means foldable into the camera-back, and a collapsible body portion carrying the lens-board and foldable onto the camera-back.

2. In a reflector-focusing camera, a collapsible body portion interposed between the camera-back and the lens-board, and a collapsible focusing-hood supported and carried by said collapsible body portion.

3. In a reflector-focusing camera, the combination with a collapsible body portion, of a focusing-screen and reflector movable into and out of said body portion.

4. In a reflector-focusing camera, the combination of the camera-back, the collapsible body portion carrying the lens-board, a collapsible focusing-hood carried by the body portion, a focusing-screen movable from a position beneath the hood into the camera-back, and a reflector normally lying beneath the screen and movable into and out of the camera-back.

5. In a reflector-focusing camera, a collapsible body portion carrying a focusing-hood, a yieldingly-supported reflector, and a focusing-screen arranged to move against the reflector and carry the same into the camera-back.

6. In a reflector-focusing camera, a collapsible body portion carrying at the top a focusing-hood, a normally horizontal focusing-screen arranged beneath the hood and supported to swing into and out of position, a normally inclined reflector-mirror yieldingly supported in the path of movement of the screen, and a reflector-positioning device.

7. In a reflector-focusing camera, the body portion, the focusing-screen, a swinging supporting element, a normally inclined reflector having a pivotal connection with said supporting element, a pneumatically-controlled positioning device operating against said supporting element, and means for moving the reflector into the back of the camera.

In witness whereof I have hereunto set my hand in presence of two subscribing witnesses.

CHARLES E. PECZENIK.

Witnesses:
W. J. SKERTEN,
O. J. NORWOOD.